(12) United States Patent
Jost et al.

(10) Patent No.: US 12,017,578 B2
(45) Date of Patent: Jun. 25, 2024

(54) ADAPTING DRIVE CURRENT FOR EMITTERS BASED ON CHARACTERISTICS OF A COVER

(71) Applicant: LUMILEDS LLC, San Jose, CA (US)

(72) Inventors: Peter Jost, Aachen (DE); Andreas Timinger, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/926,494

(22) PCT Filed: May 18, 2021

(86) PCT No.: PCT/US2021/033010
§ 371 (c)(1),
(2) Date: Nov. 18, 2022

(87) PCT Pub. No.: WO2021/236673
PCT Pub. Date: Nov. 25, 2021

(65) Prior Publication Data
US 2023/0278487 A1    Sep. 7, 2023

Related U.S. Application Data

(60) Provisional application No. 63/026,460, filed on May 18, 2020.

(30) Foreign Application Priority Data

Jul. 23, 2020  (EP) .................................... 20187340

(51) Int. Cl.
*B60Q 1/26* (2006.01)
*B60Q 3/80* (2017.01)

(52) U.S. Cl.
CPC ......... *B60Q 1/2607* (2013.01); *B60Q 1/2696* (2013.01); *B60Q 3/80* (2017.02)

(58) Field of Classification Search
CPC ......... B60Q 1/2696; B60Q 1/607; B60Q 3/80
See application file for complete search history.

(56) References Cited

U.S. PATENT DOCUMENTS 8,564,205 B2 * 10/2013 Roberts .................. B60Q 1/444
362/545
2007/0091602 A1    4/2007 van Voorst Vader et al.
(Continued)

FOREIGN PATENT DOCUMENTS

DE    102008039071 A1    2/2010
DE    202017105789 U1    10/2017
(Continued)

OTHER PUBLICATIONS

International Search Report and Written Opinion dated Sep. 10, 2021 for PCT International Application No. PCT/US2021/033010.
(Continued)

*Primary Examiner* — Thomas M Sember
(74) *Attorney, Agent, or Firm* — Volpe Koenig

(57) ABSTRACT

An automobile rear lighting includes a first emitter that emits a first light through a cover and a second emitter that emits a second light, different from the first light, through the cover such that an output light including the first light and the second light is emitted through the cover. The automobile rear lighting also includes a driving apparatus. The driving apparatus provides a first driving current to the first emitter and a second driving current to the second emitter. The driving apparatus adapts a magnitude of the first driving current and the second driving current based on at least one of at least one property of the cover or at least one optical component of the automobile rear lighting and a pre-defined color coordinates specification for the output light.

18 Claims, 7 Drawing Sheets

(56) References Cited

U.S. PATENT DOCUMENTS

| | | | |
|---|---|---|---|
| 2008/0130303 A1* | 6/2008 | Medina | B60Q 1/2603 |
| | | | 362/475 |
| 2019/0170320 A1 | 6/2019 | Norris et al. | |
| 2020/0045787 A1 | 2/2020 | Nolan et al. | |

FOREIGN PATENT DOCUMENTS

| | | |
|---|---|---|
| DE | 202017105790 U1 | 10/2017 |
| JP | 2010-538432 A | 12/2010 |
| KR | 101807682 B1 | 12/2017 |

OTHER PUBLICATIONS

International Preliminary Report on Patentability Chapter I dated Nov. 17, 2022 for PCT International Application No. PCT/US2021/033010.

Extended European Search Report dated Jan. 18, 2021 for European Patent Application No. 20187340.3.

* cited by examiner

ADAPTING DRIVE CURRENT FOR EMITTERS BASED ON CHARACTERISTICS OF A COVER

CROSS REFERENCE TO RELATED APPLICATIONS

This application is a § 371 application of International Application No. PCT/US2021/033010, filed May 18, 2021, which claims the benefit of U.S. Provisional Patent Application No. 63/026,460, which was filed on May 18, 2020, and European Patent Application Number 20187340.3, which was filed on Jul. 23, 2020, the contents of which are hereby incorporated by reference herein.

BACKGROUND

Rear lighting is a significant component of the lighting system mounted on a car, which includes tail lamps, stop lamps, backup lamps, and etc. For instance, a backup lamp is needed to warn other vehicles and pedestrians that the car is moving backward. Car manufacturers aim to achieve a certain color appearance in rear lighting as a styling target.

SUMMARY

An automobile rear lighting includes a first emitter that emits a first light through a cover and a second emitter that emits a second light, different from the first light, through the cover such that an output light including the first light and the second light is emitted through the cover. The automobile rear lighting also includes a driving apparatus. The driving apparatus provides a first driving current to the first emitter and a second driving current to the second emitter. The driving apparatus adapts a magnitude of the first driving current and the second driving current based on at least one of at least one property of the cover or at least one optical component of the automobile rear lighting and a pre-defined color coordinates specification for the output light

BRIEF DESCRIPTION OF THE DRAWINGS

A more detailed understanding can be had from the following description, given by way of example in conjunction with the accompanying drawings wherein.

DETAILED DESCRIPTION

Figure 1:
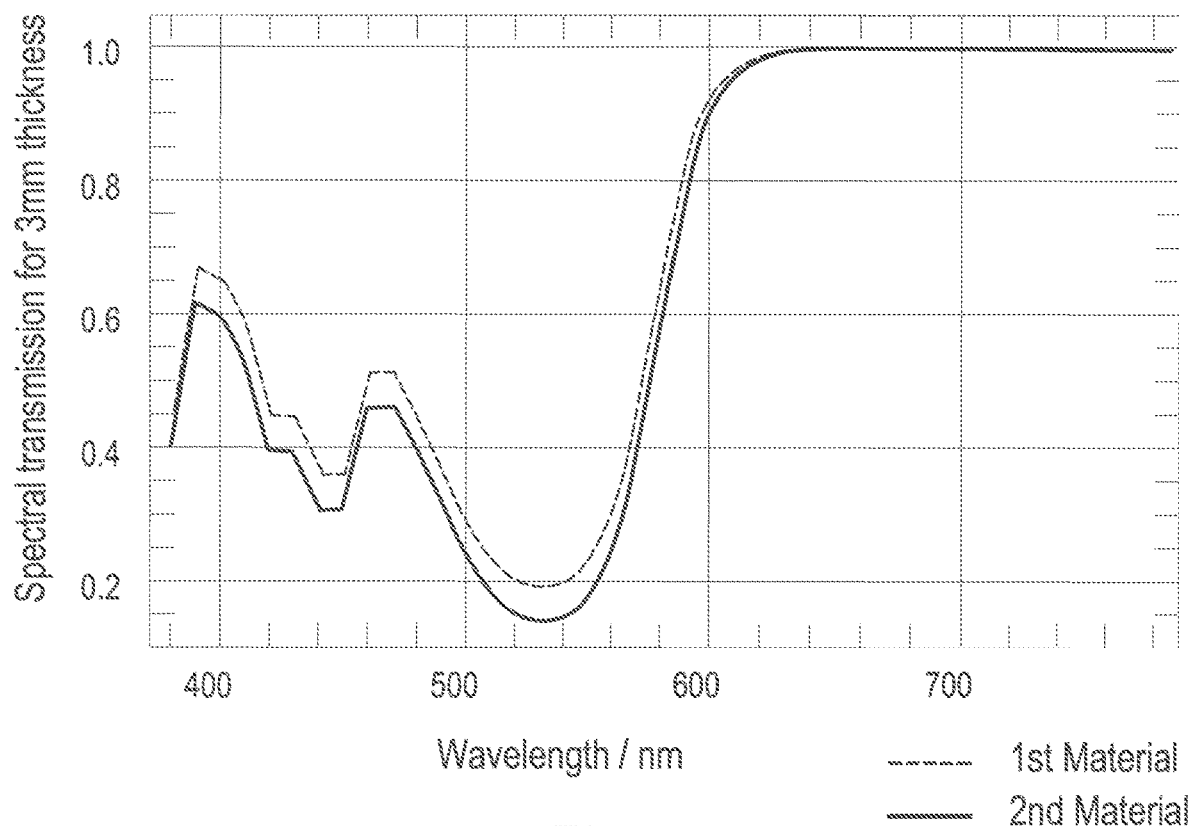
FIG. 1 is a graph showing a spectral transmission of light through two different materials having the same thickness.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

The specific requirements for rear lighting are typically defined by car makers, for example, to achieve certain styling goals. However, they may also come from technical aspects, such as the stability of the cover glass requiring a certain thickness. This may pose challenges to rear lighting manufacturers since they have to cope with various requirements specific for every car type. For example, since the materials as well as specifications of the materials may differ among cars, it is difficult for the rear lighting manufacturers to still provide an illumination that meets the specific requirements.

Take the backup luminaire as an example. These luminaires typically include a light source, a housing, and an optical system. The cover may function as the last element of the optical system versus the environment. This transparent element thus shields the inner side of the luminaire versus the environment. Specifications of the material can be different from each other, for instance, thickness of the material might differ. Cover material is usually dyed in the volume, which means a thicker cover will have a stronger color (e.g., more absorption than a thinner cover of the same material). Thus, due to the interaction between a dedicated emission spectrum of the LED and the specific absorption spectrum of the cover, one particular LED can only be applied for a specific material of the cover made from a specific grade of colored plastic as well as a specific range of thicknesses of the cover made from the aforementioned material. In other words, the specific configuration of the LED may depend on the material of the cover as well as the thickness of the cover, which may thus necessitate repeated new configurations of the LED for different car manufacturers.

Further, inside the backup luminaire, the optical system can have transparent or reflecting elements to redirect the light from the light source to form it into a bundle of specific directional shape (e.g., luminous intensity distribution). The optical system can also have properties that may change the spectral distribution of the light.

Apart from material and thickness of the cover as well as characteristics of the optical system, settings of the driving parameters of the LED may play an important role in the rendering of the illumination meeting the legal regulations as well. An LED driver may provide the lamps with current, where thermal stability may be provided by proper thermal design of the system. In operation, different temperatures may occur due to different external thermal load (sun, exterior temperature), etc. Regulation of the temperature may thus require testing at given conditions with the luminaire in a laboratory. Still, in different cars and different luminaires, the thermal design might lead to very different temperatures of LEDs of the same type.

Therefore, potential influence factors or boundary conditions to the spectral distribution of the light may include the light source from its architecture, the driving parameters of the light source, such as temperature and current, and each element in the optical system, such as the cover with its material and thickness. Accordingly, each change in the boundary conditions may have an impact on the illumination outside the luminaire with the risk of the rendered illumination not meeting the legal regulations. Thus, a new application of the rear lighting with new boundary conditions may not be served by the same LED, which may thus require a new rear lighting product.

It may therefore be desirable to have an automobile rear lighting that can be used for different variations of material and thickness of the cover such that illumination meeting the legal regulations after transmission through a cover can be provided.

FIG. 1 is a graph showing a spectral transmission of light through two different materials having the same thickness. In the example illustrated in FIG. 1, the thickness is 3 mm and the output light was transmitted through the two different materials that differ from each other in the resulting spectral distribution. This means that different materials may exhibit different absorption capabilities, which may thus greatly affect the output illumination.

Figure 2:
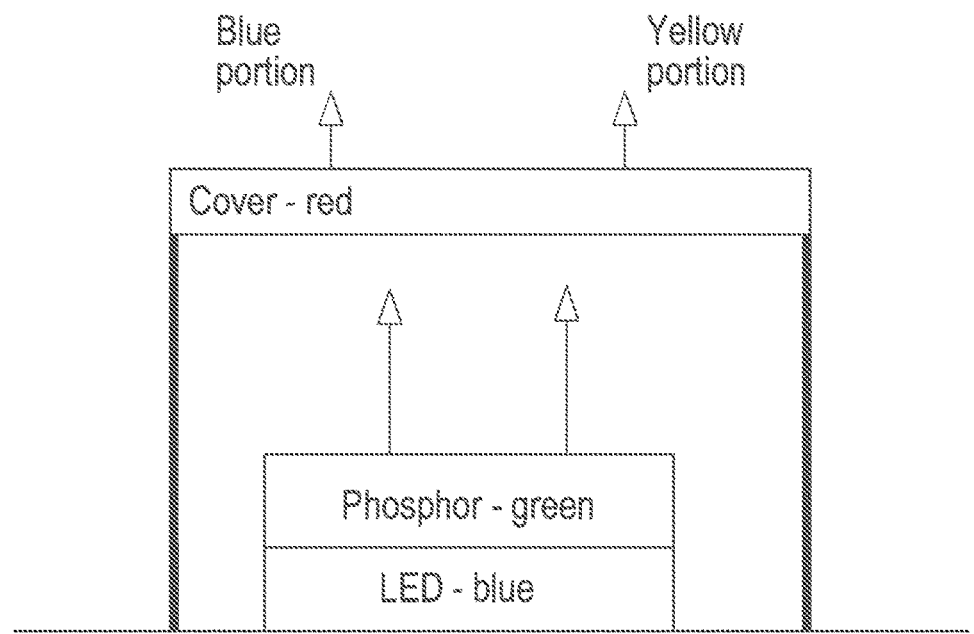
FIG. 2 is a diagram of an example single-chip backup lamp.

FIG. 2 is a diagram of an example single-chip backup lamp. In the example illustrated in FIG. 2, single-chip backup lamp includes a housing and a blue LED in the housing that is covered by a green phosphor. The phosphor is made in a way such that part of the blue light can transmit without conversion whereas the other part of the blue light is converted. The phosphor may be partly transparent for the blue light (the transparent part of the phosphor is not directly shown in FIG. 2). The unconverted light and the light converted by the green phosphor may both transmit through a cover, which is red.

Figure 3:
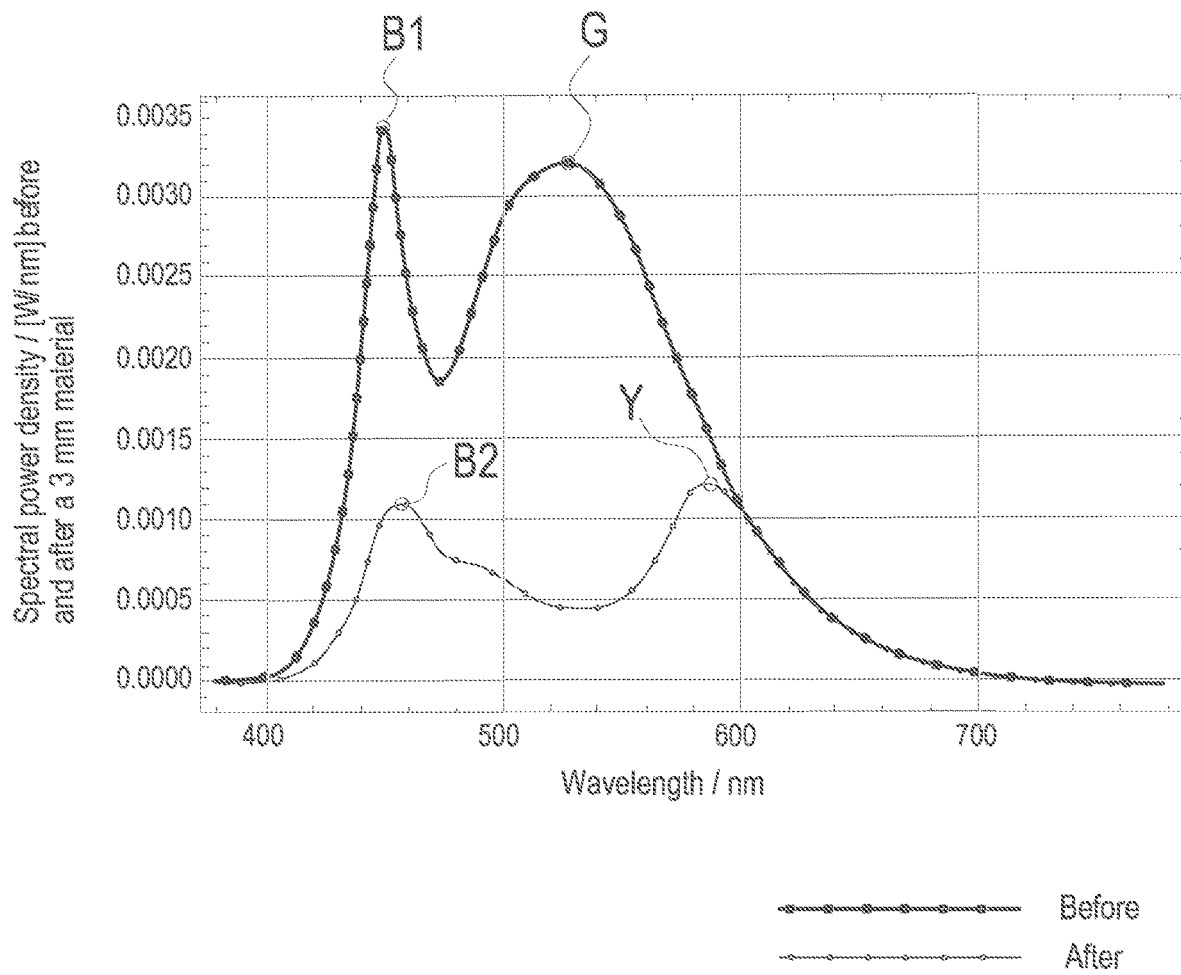
FIG. 3 is a graph of the spectral power density of a transmission of light before and after passing through a 3 mm thick cover.

FIG. 3 is a graph of the spectral power density of a transmission of light before and after passing through a 3 mm thick cover. In the example illustrated in FIG. 3, before transmitting through the cover, there is a portion of blue light, illustrated with a peak denoted by B1 in FIG. 3, as well as a portion of green light, illustrated with a peak denoted by G in FIG. 3, which represents the light that is converted by the green phosphor. The peak point B1 relates to a wavelength of 450 mm whereas the peak point G relates to a wavelength of 515 mm, which is with a wider spectrum compared with the peak point B1. Thereafter, due to the interaction between dedicated emission spectrum of the blue LED as well as the green phosphor and the specific absorption spectrum of the red cover, the output illumination rendered relates to two different portions, denoted by peak points B2 and Y respectively in FIG. 3. More specifically, the portion of green light (the peak point G) before transmitting through the cover is then transformed to yellow illumination (the peak point Y), whereas the portion of blue color (the peak point B1) is transformed to a portion of light represented in FIG. 3 by the peak point B2, which is close to 550 nm. The blue light transmitted (B2) and the yellow light transmitted (Y) together form white light of an appropriate color point according to the regulation. Therefore, as described above, even slight changes in the boundary conditions of, for instance, the material of the cover or the thickness of the cover, may result in changes in the output illumination. Thus, there may exist a risk of the output illumination not meeting the color coordinate specifications. It may thus be desirable to consider different properties of the cover in meeting the color coordinate specification and, in the meantime, to provide a method during the manufacturing process for adapting the same light emitters to different boundary conditions so as to ease the manufacturing process.

In embodiments, the color coordinates specification may refer to a color point as well as spectral power density stipulated under the legal regulations regarding the aforementioned color points.

Figure 4:
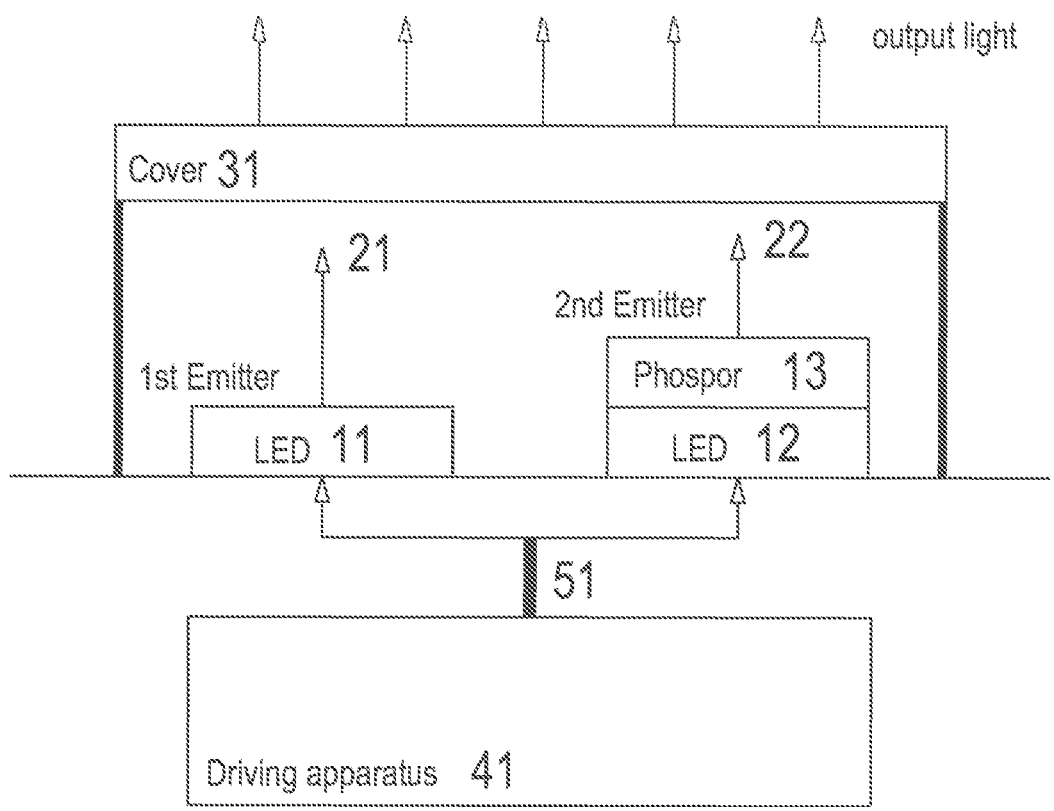
FIG. 4 is a schematic drawing showing an example automobile lighting.

FIG. 4 is a schematic drawing showing an example automobile lighting. In the example illustrated in FIG. 4, the automobile lighting includes a first emitter that includes an LED 11 and a second emitter that includes a second LED 12 covered by a phosphor 13. The first emitter emits a first light 21 and the second emitter emits a second light 22, which has undergone conversion by the phosphor 13. Thus, the first light 21 and the second light 22 may transmit through a cover 31 and, thus, give rise to an output light. Further, the first emitter and the second emitter may be driven by a driving apparatus 41, which may provide a current 51 to the first emitter and the second emitter. In the example illustrated in FIG. 4, the first emitter is different from the second emitter. Further, the current 51 provided by the driving apparatus 41 may be adapted for the output light to meet a color coordinates specification and the adaptation may be dependent on at least one property of the cover 31.

For a backup lamp, for example, the first LED 11 may be a blue LED such that the first light 21 is blue and the second LED 12 may also be a blue LED that is covered by a green phosphor 13 such that the second light 22 emitted by the second emitter is green. Further, the cover 31 may be of the color red. Thus, the first light 21 being blue and the second light 22 being green may transmit through the red cover 31 rendering an output light which is of a white color point that meets the legal regulations. As is mentioned above, properties of the cover 31 may greatly affect the rendering of the output light, which thus may necessitate the adaptation of the current 51 provided by the driving apparatus 41 to the first emitter and the second emitter. More specifically, depending on the specific properties of the cover 31, such as the material of the cover 31 and the specific thickness of the cover 31, the current 51 may be adapted such that the output light always meets the requirement of a white color point according to the legal regulations regardless of any change of either the material or the thickness of the cover. The current 51 may include two separate currents that may be independently provided and adapted for the first emitter and the second emitter, respectively.

Hence, it may be advantageous that one specific arrangement of the automobile rear lighting, including the first emitter and the second emitter, may be applicable to the different covers, which each may have their own preferred material and thickness of the cover. The manufacturing process may thus be more effective and flexible. In addition, the arrangement of the two emitters can be easily detected simply by observing over and through the cover, which may thus greatly simplify the manufacturing process.

For an example backup lamp, a red cover may commonly have a thickness between 2 mm and 4 mm. Influencing factors regarding the thickness can include stability and styling of the luminaire. In embodiments, the cover may be made of plastic.

Figure 5:
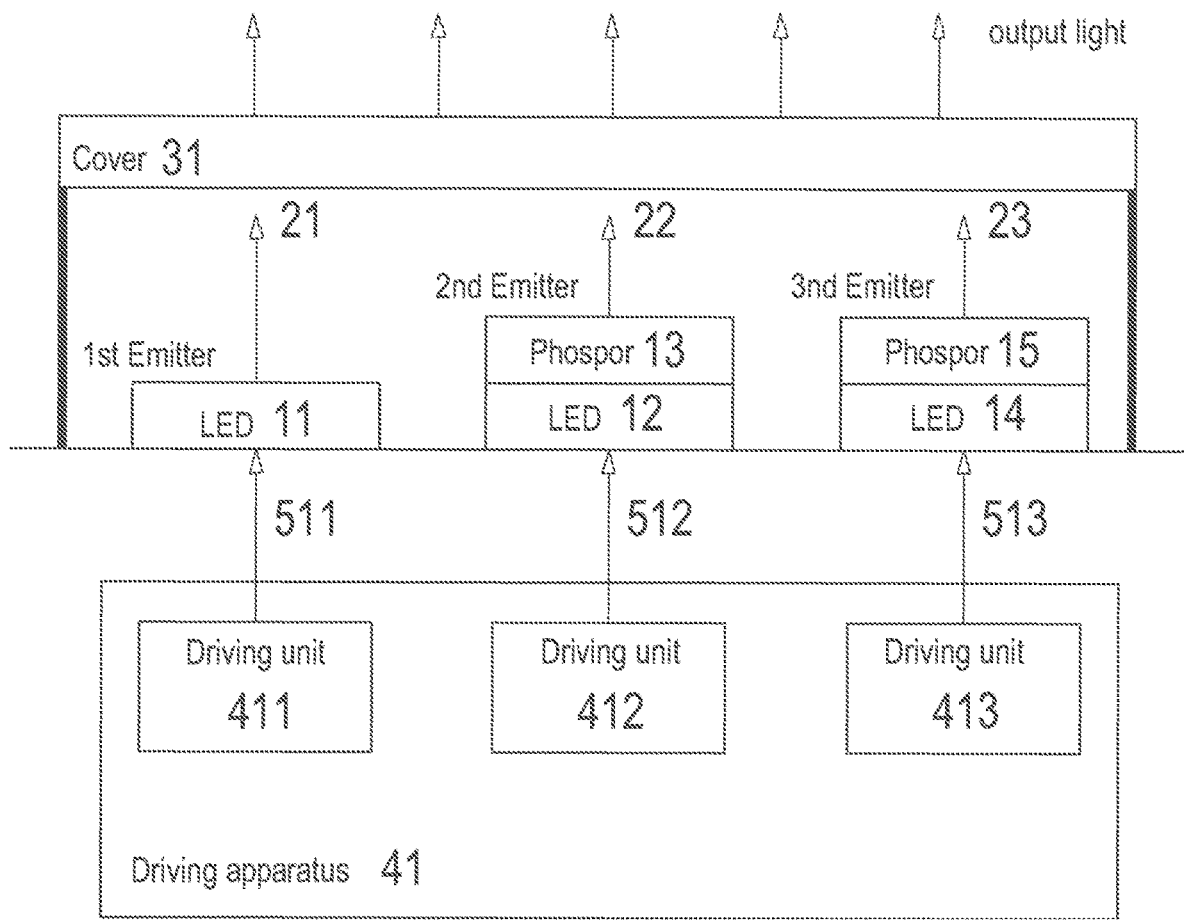
FIG. 5 is a schematic drawing of another automobile rear lighting.

FIG. 5 is a schematic drawing of another automobile rear lighting. Compared with the schematic drawing in FIG. 4, FIG. 5 incorporates a third emitter, which comprises an LED 14 configured under a phosphor 15. In embodiments, the phosphor 15 may be green. The LED 14 may emit a third light 23 that may transmit, together with the first light 21 and the second light 22, through the cover 31. Moreover, the driving apparatus 41 illustrated in FIG. 5 comprises a first driving unit 411, a second driving unit 412 and a third driving unit 413. The three driving units may respectively provide a first driving current 511, a second driving current 512 and a third driving current 513 respectively, to the first LED 11, the second LED 12 and the third LED 14. Thereby, each of the three driving currents provided to the three LEDs can be provided by the driving apparatus 41 and further can be adapted independently from each other. As mentioned above, changes in boundary conditions of the cover 31, such as the material of the cover and the thickness of the cover made from this material, may greatly affect the rendering of the output light. This may be due to the settle interaction that may happen between the dedicated emission spectra of the emitters and the given absorption spectrum of the cover (the given absorption spectrum of the cover being dependent on properties of the cover). It may thus be apparent that, in order to maintain a uniform output light and given the changes in the given absorption spectrum of the cover following the changes of the properties of the cover, the embodiments described herein may adapt the combined emission spectra of the emitters. Hence, since the settings of the driving parameters provided to the emitters by the driving apparatus 41 may also be decisive in the rendering of the output light, it may thus be advantageous to independently adapt the driving currents provided to the emitters so as to adapt their dedicated emission spectrum to the absorption spectrum of the cover. In this case, the configurations of the emitters in the automobile rear lighting may not have to be changed just because the covers from different manufacturers differ from each other. Of course, the configuration of three separate driving units can also be applied to FIG. 4, which means the driving apparatus 41 in FIG. 4 can also expressly comprise a first driving unit and a second driving unit for independent and separate provision and adaptation of the driving currents provided to the first emitter and the second emitter, respectively. Additionally, a temperature sensor (not shown in FIG. 4 and FIG. 5) may be included in the embodiments of the automobile rear lighting described herein. In order to protect the automobile rear lighting from extremely high temperature, fluctuations in the ambient temperature may also be taken into consideration in the provision and adaptation of the driving currents.

Taking the backup lamp of FIG. 4, for example, in FIG. 5 the third LED 14 may be green to adapt to different red covers. In the example illustrated in FIG. 5, flexibility in adapting the driving currents to the properties of the cover may be further enhanced since each of the first driving current 511, the second driving current 512 and the third driving current 513 can be adapted independently from each other. In other words, the interaction between the emission spectra of the first light 21, the second light 22 as well as the third light 23 and the absorption spectrum of the cover 31 can be more effectively and flexibly adapted depending on changes in the properties of the cover 31. The third emitter does not have to be the same as one of the first emitter and the second emitter. The selection of the configuration of the third emitter may depend on the legal regulations regarding the rendering of the output light.

The two or three driving currents may be set separately to dedicated values for the first emitter and the second emitter, respectively. Further, the first light and the second light may be different from each other in that their colors, spectral distributions or wavelengths may be different. The at least one optical element may comprise a transparent element, a reflecting element, a colored reflector, a lens and/or a prism plate and/or other optical elements that can change the spectral distribution of the light.

In embodiments, the cover may be made of plastic with a certain grade of color. Thus, the at least one property of the cover and/or the at least one optical element may be decisive in adapting the currents provided by the driving apparatus for the output light to meet the color coordinates specification. It may thus be an advantage that, with a same configuration of the first emitter and the second emitter, the color coordinates specification of the output light may be met by adapting the currents provided by the driving apparatus, which may accomplish efficiency and flexibility in configuring and manufacturing automobile rear lightings for different car manufacturers.

In embodiments, the first driving current and the second driving current may be provided by a same current source or by two separate current sources. Therein, the current sources(s) can be configured as part of the driving apparatus or can be connected with the driving apparatus. In embodiments, the first driving current and the second driving current may be provided and/or regulated independently from each other. In particular, the setting of the driving currents can be done when developing the luminaire, where there is usually no closed loop control for signaling functions in the car.

In some embodiments, the cover may be red, the first emitter may be a blue light emitting diode (LED), the second emitter may be a blue LED covered by a green emitting phosphor, and the color coordinates specification may be that of a white color point. Take the backup lamp as an example, covers can be all red but with different materials and thicknesses. It may further be required that a white illumination may be provided by the backup lamp. Therefore, the blue light emitted by the first emitter and the phosphor converted green light from the second emitter may transmit through the red cover to render a white illumination that meets the specific legal regulation of a white color point. In embodiments, the third emitter (where included) may be either a blue LED or a blue LED covered by a green emitter phosphor.

The first emitter, the second emitter and the third emitter may either be a packaged LED or a Chip-on-Board (CoB) LED. Thus, the LED chip (die) can be encapsulated in a package, in particular by CoB technologies mounting the LED chips onto a substrate.

In embodiments, the cover may be transparent or at least partially transparent. The cover can also have light-directing properties, such as a lens or a prism plate, but is not required. In embodiments, covers may not have light directing functions.

In summary, according to the embodiments described herein, automobile rear lightings with multi-emitters, for instance multi-chip LEDs, with the emitters emitting different colors, may provide output illuminations that each meets a specific color target after transmission through a cover. By use of separate emitters with different colors, the same configuration of the emitters in the automobile rear lighting can be applied for variations of properties of the cover. This may be accomplished by independently adapting the driving currents provided to the separate emitters. Thus, the repetition of configuring a new product for each car manufacturer may no longer be necessary, and, for car manufactures with different specifications of the cover, a uniform appearance in rear lighting may be achieved effectively.

Figure 6:
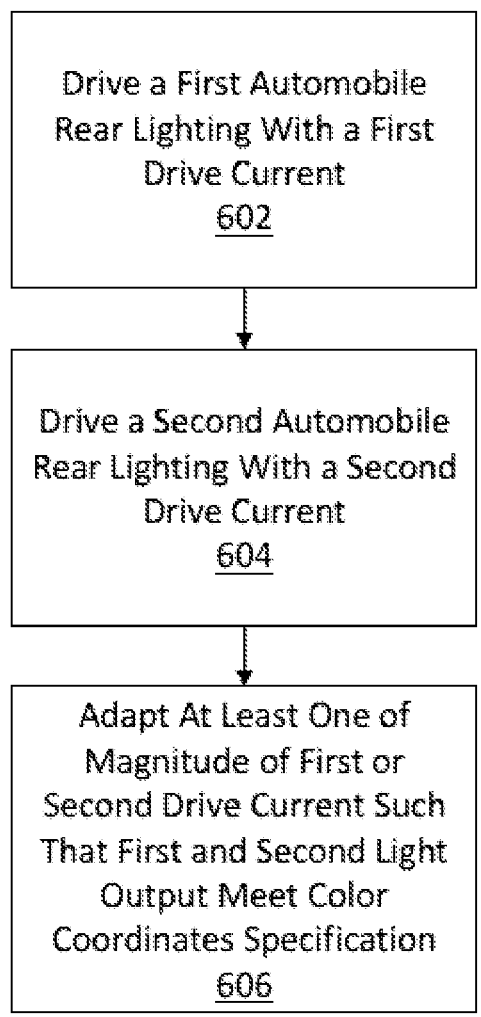
FIG. 6 is a flow diagram of an example method of implementing automobile rear lightings meeting a color coordinates specification

FIG. 6 is a flow diagram of an example method of implementing automobile rear lightings meeting a color coordinates specification. In the example illustrated in FIG. 6, the method includes driving a first automobile rear lighting with a first drive current (602). In embodiments, the first current may have a first magnitude using a first driving apparatus such that a first output light is transmitted through a first cover. At least one of the first cover or at least one optical component of the first automobile rear lighting may comprise a first plurality of properties. The method may also include driving a second automobile rear lighting with a second drive current (604). In embodiments, the second current may have a second magnitude using a second driving apparatus such that a second output light is transmitted through a second cover. At least one of the second cover or at least one optical component of the second automobile rear lighting may comprise a second plurality of properties. At least one of the first plurality of properties may be different from the second plurality of properties. The method may further include adapting at least one of the magnitude of the first drive current or the magnitude of the second drive current (606), for example, such that the first output light and the second output light meets the color coordinates specification.

Figure 7:
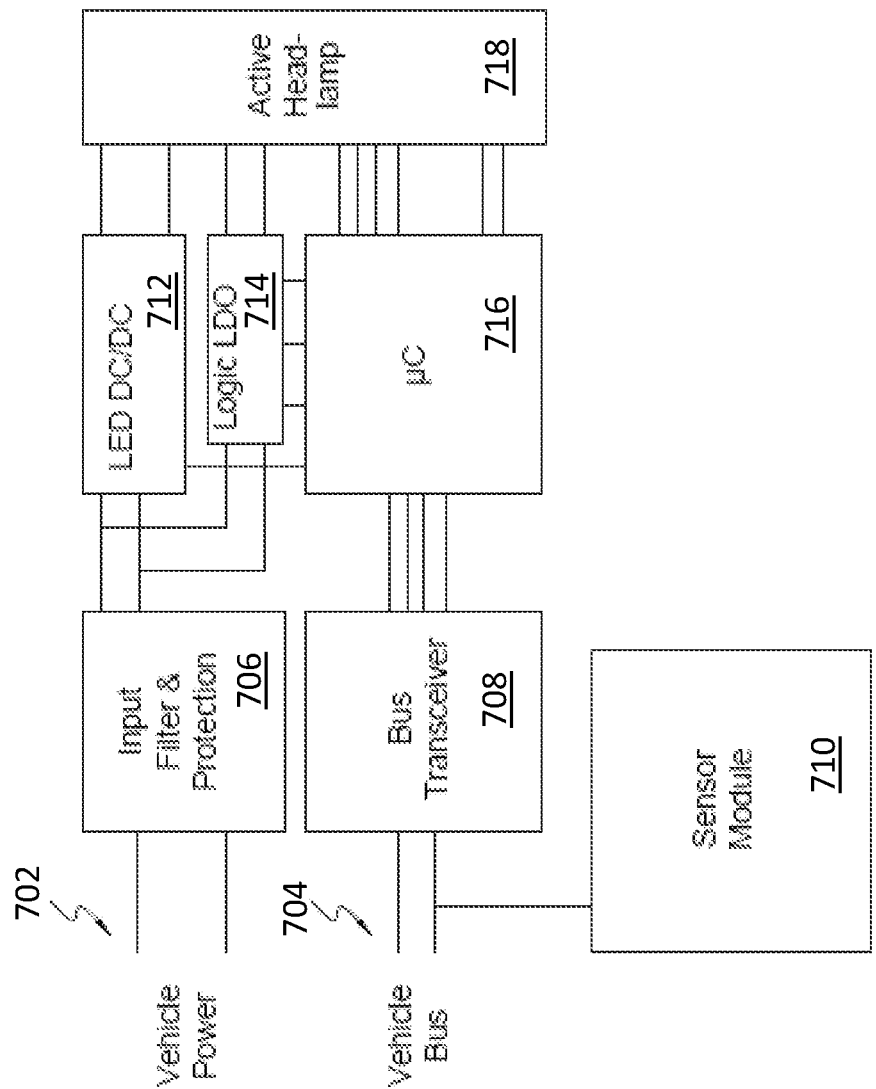
FIG. 7 is a diagram of an example vehicle headlamp system.

FIG. 7 is a diagram of an example vehicle headlamp system 700 that may incorporate one or more of the embodiments and examples described herein. The example vehicle headlamp system 700 illustrated in FIG. 7 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (pc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 706 and the active headlamp 718 to receive filtered power and provide a drive current to power LEDs in the LED array in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
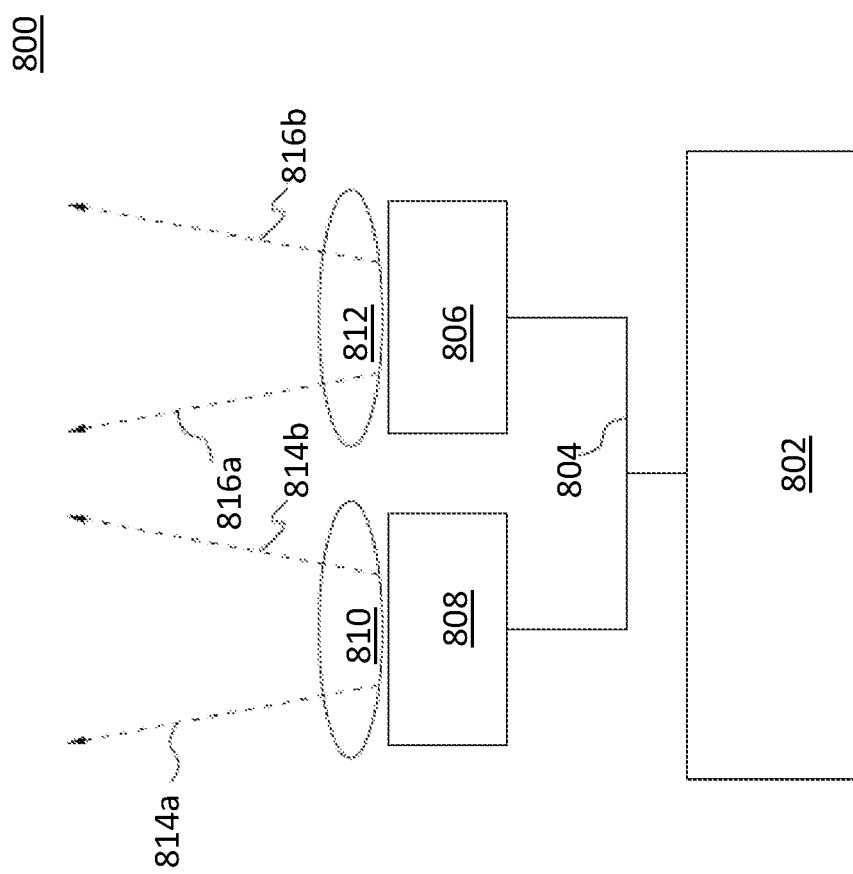
FIG. 8 is a diagram of another example vehicle headlamp system.

FIG. 8 is a diagram of another example vehicle headlamp system 200. The example vehicle headlamp system 800 illustrated in FIG. 8 includes an application platform 802, two LED lighting systems 806 and 808, and secondary optics 810 and 812.

The LED lighting system 808 may emit light beams 814 (shown between arrows 814a and 814b in FIG. 8). The LED lighting system 806 may emit light beams 816 (shown between arrows 816a and 816b in FIG. 8). In the embodiment shown in FIG. 8, a secondary optic 810 is adjacent the LED lighting system 808, and the light emitted from the LED lighting system 808 passes through the secondary optic 810. Similarly, a secondary optic 812 is adjacent the LED lighting system 206, and the light emitted from the LED lighting system 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. LED lighting systems 208 and 206 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 802 may provide power and/or data to the LED lighting systems 806 and/or 808 via lines 804, which may include one or more or a portion of the power lines 702 and the data bus 704 of FIG. 7. One or more sensors (which may be the sensors in the vehicle headlamp system 800 or other additional sensors) may be internal or external to the housing of the application platform 802. Alternatively, or in addition, as shown in the example vehicle headlamp system 700 of FIG. 7, each LED lighting system 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 806 and 808 may be sensors (e.g., similar to sensors in the sensor module 710 of FIG. 7) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. An automobile rear lighting, comprising:
    a first emitter configured to emit a first light through a cover;
    a second emitter configured to emit a second light, different from the first light, through the cover such that an output light including the first light and the second light is emitted through the cover; and
    a driving apparatus configured to provide a first driving current to the first emitter and a second driving current to the second emitter, the driving apparatus being configured to adapt a magnitude of the first driving current and the second driving current based on at least one property of the cover and a pre-defined specification for the output light.

2. The automobile rear lighting of claim 1, wherein the driving apparatus comprises a separate driver for each of the first emitter and the second emitter.

3. The automobile rear lighting of claim 1, wherein the separate driver for each of the first emitter and the second emitter are configured to provide a drive current independently of each other.

4. The automobile rear lighting of claim 1, wherein the driving apparatus comprises a single driver for both the first emitter and the second emitter.

5. The automobile rear lighting of claim 1, wherein the at least one property of the cover comprises a thickness of the cover.

6. The automobile rear lighting of claim 1, wherein the at least one property of the cover comprises a material of the cover.

7. The automobile rear lighting of claim 1, further comprising at least one temperature sensor configured to sense an ambient temperature near the first emitter and the second emitter, wherein the driving apparatus is further configured to adapt the magnitude of the first driving current and the second driving current based on the ambient temperature sensed by the at least one temperature sensor.

8. The automobile rear lighting of claim 1, further comprising:
    a third emitter configured to emit a third light, different from at least one of the first light or the second light, such that the output light includes the first light, the second light and the third light emitted through the cover, wherein the driving apparatus is further configured to provide a third driving current to the third emitter.

9. The automobile rear lighting of claim 8, wherein the driving apparatus further comprises a separate driver for each of the first emitter, the second emitter and the third emitter.

10. The automobile rear lighting of claim 8, wherein the driving apparatus further comprises a single driver for all of the first emitter, the second emitter and the third emitter.

11. The automobile rear lighting of claim 8, wherein the third emitter is one of a blue LED or a blue LED covered by a green emitting phosphor.

12. The automobile rear lighting of claim 8, wherein the first emitter, the second emitter and the third emitter are one of a single, multi-color packaged LED or a single, multi-color Chip-on-Board LED.

13. The light source of claim 1, wherein:
    the cover is red,
    the first emitter is a blue light emitting diode (LED),
    the second emitter is a blue LED covered by a green emitting phosphor, and
    the color coordinates specification is that of a white color point.

14. The light source of claim 1, wherein the cover is at least partially transparent.

15. A method for implementing automobile rear lightings meeting a color coordinates specification, the method comprising:
    driving a first automobile rear lighting with a first drive current having a first magnitude using a first driving apparatus such that a first output light is transmitted through a first cover, at least one of the first cover or at least one optical component of the first automobile rear lighting comprising a first plurality of properties;
    driving a second automobile rear lighting with a second drive current having a second magnitude using a second driving apparatus such that a second output light is transmitted through a second cover, at least one of the second cover or at least one optical component of the second automobile rear lighting comprising a second plurality of properties, at least one of the first plurality of properties being different from the second plurality of properties; and adapting at least one of the magnitude of the first drive current or the magnitude of the second drive current such that the first output light and the second output light meets the color coordinates specification.

16. The method of claim 15, further comprising sensing an ambient temperature in a vicinity of the first automobile rear lighting and the second automobile rear lighting, wherein the adapting the at least one of the magnitude of the first drive current or the magnitude of the second drive current is based at least in part on the sensed ambient temperature.

17. The method of claim 15, wherein the first driving apparatus and the second driving apparatus are identical.

18. The method of claim 15, wherein the first plurality of properties and the second plurality of properties comprise at least one of a thickness of the first cover, a thickness of the second cover, a material of the first cover or a material of the second cover.

* * * * *